US009940478B2

United States Patent
Brutschy et al.

(10) Patent No.: US 9,940,478 B2
(45) Date of Patent: *Apr. 10, 2018

(54) FINE-GRAINED USER CONTROL OVER USAGES OF SENSITIVE SYSTEM RESOURCES HAVING PRIVATE DATA WITH APPLICATIONS IN PRIVACY ENFORCEMENT

(71) Applicant: International Business Machines Corporation, Armonk, NY (US)

(72) Inventors: Lucas Brutschy, Zurich (CH); Pietro Ferrara, White Plains, NY (US); Marco Pistoia, Amawalk, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 152 days.

This patent is subject to a terminal disclaimer.

(21) Appl. No.: 14/742,904

(22) Filed: Jun. 18, 2015

(65) Prior Publication Data
US 2016/0246992 A1    Aug. 25, 2016

Related U.S. Application Data

(63) Continuation of application No. 14/630,001, filed on Feb. 24, 2015.

(51) Int. Cl.
G06F 7/04     (2006.01)
G06F 17/30    (2006.01)
(Continued)

(52) U.S. Cl.
CPC ............ *G06F 21/6245* (2013.01); *G06F 8/30* (2013.01); *G06F 8/65* (2013.01); *G06F 8/60* (2013.01);
(Continued)

(58) Field of Classification Search
CPC ........ G06F 21/6218; G06F 8/60; G06F 21/62; G06F 21/6245; G06F 21/6254;
(Continued)

(56) References Cited

U.S. PATENT DOCUMENTS 6,779,114 B1 *  8/2004  Chow ..................... G06F 21/14
                                                    713/189
7,363,275 B2    4/2008  Kojima et al.
(Continued)

OTHER PUBLICATIONS

Frank Tip, "A Survey of Program Slicing Techniques," CWI (Centre for Mathematics and Computer Science) Amsterdam, The Netherlands, 1994, 65 pgs.
(Continued)

*Primary Examiner* — Jayesh Jhaveri
(74) *Attorney, Agent, or Firm* — Harrington & Smith (57) ABSTRACT

A system and method whereby permission is accessed that is to be revoked for an application. The permission involves access to private data of a user via an API of an OS. It is determined, in the application, program point(s) involving access to the private data of the user via the API. For each selected one of the program point(s), code in the application is rewritten to replace a source statement, at the selected program point, that accesses the private data with another statement that allocates a mock object or value based on a type of an actual value returned by the source statement. The mock object or value does not expose the private data of the user. The application with the rewritten code is packaged as an output application able to be subsequently executed by the user, and is output for use by the user.

15 Claims, 6 Drawing Sheets

(51) Int. Cl.
  H04N 7/16    (2011.01)
  G06F 21/62   (2013.01)
  G06F 9/445   (2018.01)
  G06F 9/44    (2018.01)

(52) U.S. Cl.
  CPC .......... *G06F 21/62* (2013.01); *G06F 21/6218* (2013.01); *G06F 21/6254* (2013.01); *G06F 21/6281* (2013.01)

(58) Field of Classification Search
  CPC .......... G06F 21/6281; G06F 8/30; G06F 8/65; G06F 7/04; G06F 17/30; H04N 7/16
  See application file for complete search history.

(56) References Cited

U.S. PATENT DOCUMENTS

| | | | |
|---|---|---|---|
| 8,495,080 B2* | 7/2013 | Gao | G06F 17/30289 707/762 |
| 8,639,625 B1 | 1/2014 | Ginter et al. | |
| 8,640,107 B2 | 1/2014 | Jaegen et al. | |
| 8,640,191 B2 | 1/2014 | Lim | |
| 8,844,036 B2* | 9/2014 | Saidi | G06F 21/6218 726/1 |
| 8,869,286 B1 | 10/2014 | Liu | |
| 9,031,994 B1 | 5/2015 | Cao | |
| 2005/0010922 A1* | 1/2005 | Czajkowski | G06N 5/003 718/102 |
| 2007/0033442 A1* | 2/2007 | Tillmann | G06F 11/3684 714/45 |
| 2010/0023995 A1 | 1/2010 | Kim | |
| 2012/0084759 A1 | 4/2012 | Candea | |
| 2012/0130828 A1 | 5/2012 | Cooley | |
| 2013/0312102 A1 | 11/2013 | Brake | |
| 2014/0095142 A1 | 4/2014 | Baldwin | |
| 2014/0289789 A1 | 9/2014 | Poornachandran | |
| 2015/0235042 A1* | 8/2015 | Salehpour | G06F 21/6218 726/4 |
| 2015/0235043 A1* | 8/2015 | Haik | G06F 21/6218 726/27 |
| 2016/0070640 A1 | 3/2016 | Clark | |
| 2016/0147642 A1* | 5/2016 | Haeuptle | G06F 11/3684 717/124 |
| 2016/0188317 A1* | 6/2016 | Hilliar | G06F 8/65 717/172 |
| 2016/0246986 A1* | 8/2016 | Milman | H04L 63/08 |

OTHER PUBLICATIONS

Robert Nieuwenhuis and Albert Oliveras, "On SAT Modulo theories and Optimization Problems", A Biere and C.P. Gomes (Eds.): SAT 2006, LNCS 4121, pp. 156-169, 2006, printed by Springer-Verlag Berlin Heidelberg, 14 pgs.
Xprivacy Pro, downloaded from http://www.xprivacy.eu/ on Feb. 6, 2015, 3 pgs.
[New App] XPrivacy Gives You Massive Control Over What your Installed Apps Are Allowed to Do, downloaded from http://www.androidpolice.com/2013/06/23/xprivacy-gives-you-massive-control-over-what-your-installed-apps-are-allowed-to-do/, Jun. 23, 2013, 4 pgs.
"Android 4.3 Includes Hidden App Permissions Manager That Could Bolster Privacy & Security", download from http://techcrunch.com/2013/07/26/android-app-ops/, Jun. 26, 2013, 9 pgs.
"App Manifest", downloaded from http://developer.android.com/guide/topics/manifest/manifest-intro.html; on Feb. 8, 2015, 7 pgs.
"Android 4.3 hidden feature lets you tap into app permissions", CNet, Jul. 26, 2013, downloaded from http://www.cnet.com/news/android-4-3-hidden-feature-lets-you-tap-into-app-permissions/, 3 pgs.
Permission Manager App Description page, downloaded from https://play.google.com/store/apps/details?id=com.appaholics.aplauncher; on Feb. 12, 2015, 3 pgs.
App Operations—Permission Manger, downloaded from https://play.google.com/store/apps/details?id=de.kamor.android.appops_permissionmanager, on Feb. 12, 2015, 2 pgs.
Permission Settings, downloaded from https://play.google.com/store/apps/details?id=com.ovidos.android.permissionmanager, on Feb. 12, 2015, 2 pgs.
K.W.Y. Au, Y.F., et al., PScout Analyzing the Android Permission Specification:, ACM 978-1-5403-1651-Apr. 12, 2010, CCS'72 Oct. 2012, 12 gs.
P. Cousot, "Constructive design of a hierarchy of semantics of a transition system by abstract interpretation", Theoretical Computer Science, 277 (2002), pp. 47-103.
P. Cousot, et al., "Abstract Interpretation: A Unified Lattice Model for Static Analysis of Programs by Construction or Approximation of Fixpoints", POPL '77, ACM, Jan. 1977, 16 pgs.
P. Cousot, et al., "Systematic Design of Program Analysis Frameworks", POPL '79, ACM, Jan. 1979, 15 pgs.
L. DeMoura, et al., "Z3: An Efficient SMT Solver", TACAS '08, Springer, 2008, 2 pgs.
E. W. Dijkstra, "Guarded Commands, Nondeterminacy and formal Derivation of Programs", Communications of the ACM, vol. 18, No. 8, Aug. 1975, pp. 453-457.
A.P. Felt, et al., "Android Permissions Demystified", CCS '11, ACM, Oct. 2011, pp. 627-637.
C.A.R. Hoare, An Axiomatic Basis for Computer Programming, Communications of the ACM, vol. 12, No. 10, Oct. 1969, pp. 576-583.
S. Horwitz, et al., "Interprocedural Slicing Using Dependence Graphs", ACM SIGPLAN, 2003, 3 pgs.
T. reps, et al., "Precise Interprocedural Dataflow Analysis via Graph Reachability", POPL '95, ACM 1995, pp. 49-61.
J. H. Saltzer, et al., "The Protection of Information in Computer Systems", IEEE, vol. 63, Sep. 1975, 30 pgs.
M. Sridharan, et al., "Thin Slicing", PLDI '07, ACM, Jun. 2007, 11 pgs.
Y. Zheng, et al., "Z3-str. AZ3-Based String Solver for Web Application Analysis", ESEC/FSE '13, ACM, Aug. 2013, 11 pgs.
SARRAB, "Policy based runtime verification of information flow," PH.D. thesis Software Technology Research Laboratory, Faculty of Technology De Montfort University, 2011.
POLL, "Lecture Notes on Language-Based Security", Radboud University Nijmegen, 2011.
ENCK, "Analysis techniques for mobile opertaing system security," Diss. The Pennsylvania State University, 2011.
KNORR, "Dynamic access control through Petri net workflows,", Computer Security Applications, 2000, ACSAC '00, 16th Annual Conference, IEEE, 2000.
FRASER, "Ensuring continuity during dynamic security policy reconfiguration in DTE," Security and Privacy, 1998 Proceedings, 1998 IEEE Symposium, IEEE, 1998.
Benjamin Davis et al. "RetroSkeleton", Proceeding of the 11th Annual International Conference on Mobile Systems, Applications, and Services, Mobisys' 13, Jun. 1, 2013, p. 181, XP055252407, New York, New York USA.
Jinseong Jeon et al. "Dr. Android and Mr. Hide" Proceedings of the Second ACM Workshop on Security and Privacy in Smartphones and Mobile Devices, SPSM '12, Jan. 1, 2012, p. 3, XP055217036, New York, New York USA.
Clint Gibler et al. "AndroidLeaks: Automatically Detecting Potential Privacy Leaks in Android Applications on a Large Scale" Jun. 13, 2012, Trust and Trusrworthy Computing, Springer Berlin Heidelberg, Berlin, Heidelberg, pp. 291-307, XP047006812.

* cited by examiner

FIG. 1

```
1 String str1 = telephonyManager.getLine1Number();
2 if (str1 != null && str1.length() == 10) {
3     String str2 = str1.substring(0, 3);
4     // initialize the DataManager class
5 }
```

FIG. 3

```
1  String deviceID = null;
2  if (telephonyManager != null)
3      deviceID = telephonyManager.getDeviceId();
4  boolean invalidDeviceID = false;
5  if (deviceID == null ||
6      deviceID.length() == 0 ||
7      deviceID.equals("000000000000000") ||
8      deviceID.equals("0")) {
9      TapjoyLog.e(TAPJOY_CONNECT,
           "Device_id_is_null,_empty_or_an_emulator.");
10     invalidDeviceID = true;
11 }
12 else //Valid device id
13     deviceID = deviceID.toLowerCase();
14 if (invalidDeviceID) {
15     ...
16 }
```

FIG. 2

```
1  private void requestLatestLocation(int paramInt) {
2      List<String> l = mLocationManager.getProviders(true);
3      if (l.size() == 0 ||
4          (l.size() == 1 && l.get(0).equals("passive")))
5          fireLocationFailedCallback(0);
6      else {
7          mLocationResponses = new HashMap();
8          for(String str : l)
9              if (!str.equals("passive"))
10                 mLocationResponses.put(str, null);
11 }
```

FIG. 4

$$
\begin{aligned}
&1\ \text{LastClusters} = \{\emptyset\} \\
&2\ \text{for } (c_1 \in \text{Constraints}): \\
&3\quad \text{NextClusters} = \emptyset \\
&4\quad \text{for } (cl \in \text{LastClusters}): \\
&5\quad\quad \text{NextClusters} = \text{NextClusters} \\
&6\quad\quad \cup \{c_2 \in cl | c_1 \bowtie c_2\}, \{c_2 \in cl | c_1 \bowtie c_2\} \cup \{c_1\}\} \\
&7\quad \text{LastClusters} = \text{NextClusters} \\
&8\ \}
\end{aligned}
$$

FIG. 8

FINE-GRAINED USER CONTROL OVER USAGES OF SENSITIVE SYSTEM RESOURCES HAVING PRIVATE DATA WITH APPLICATIONS IN PRIVACY ENFORCEMENT

CROSS-REFERENCE TO RELATED APPLICATIONS

This application is a continuation of U.S. patent application Ser. No. 14/630,001, filed on Feb. 24, 2015, the disclosure of which is incorporated by reference in its entirety.

BACKGROUND

This invention relates generally to analysis of program code and, more specifically, relates to analysis of program code accessing sensitive system resources having private data of a user.

In recent years, technology is gravitating strongly towards mobile and mobile/cloud computing architectures. Users enjoy the ability to run application and perform computations anytime and anywhere and also have constant access to their data and resources. At the same time, threats to privacy are on the rise. Applications (typically called "apps") installed by the user, e.g. on a mobile device like a smartphone or a tablet, may make undesirable use of private information. This could be in support of ad content, analytics, social computing, and the like.

As an example, there is a flashlight application, available on Google Play, which requires access to the Internet, the mobile device's state, and the like. These are not just declared permissions that got into this application's manifest by mistake, but are actually used by the application. As is known, the manifest file presents essential information about an app to the operating system, information the system must have before the system can run any of the application's code. The manifest, in particular, declares the permissions the application must have in order to access protected parts of the API (Application Programming Interface). In example of the flashlight application, the application may not need access to sensitive system resources such as the Internet or mobile device's state.

This creates a challenge for the user. On the one hand, the user would like to minimize access to sensitive system resources by an app to narrow down the probability of private data leakage (e.g., if the app sends the user's location to some third-party advertisement website). On the other hand, in some cases, apps actually use sensitive information to optimize their core behavior, e.g., in the case of social computing or in the case of freemium apps. For freemium apps, the app may be free initially but additional functionality costs money. These apps may show advertisements to the user while the user has not paid for the additional functionality. The critical piece of information is not which permissions the app requires, but how the app is utilizing the permissions the app has been granted.

BRIEF SUMMARY

The following summary is merely intended to be exemplary. The summary is not intended to limit the scope of the claims.

An exemplary method includes accessing a permission that is to be revoked for an application, wherein the permission involves access to private data of a user via an application programming interface of an operating system. The method includes determining, in the application, one or more program points involving access to the private data of the user via the application programming interface. The method further includes, for each selected one of the one or more program points, rewriting code in the application to replace a source statement, at the selected program point, that accesses the private data with another statement that allocates a mock object or value based on a type of an actual value returned by the source statement, wherein the mock object or value does not expose the private data of the user. The method also includes packaging the application with the rewritten code as an output application able to be subsequently executed by the user, and outputting the application with the rewritten code for use by the user.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: accessing a permission that is to be revoked for an application, wherein the permission involves access to private data of a user via an application programming interface of an operating system; determining, in the application, one or more program points involving access to the private data of the user via the application programming interface; for each selected one of the one or more program points, rewriting code in the application to replace a source statement, at the selected program point, that accesses the private data with another statement that allocates a mock object or value based on a type of an actual value returned by the source statement, wherein the mock object or value does not expose the private data of the user; packaging the application with the rewritten code as an output application able to be subsequently executed by the user; and outputting the application with the rewritten code for use by the user.

An exemplary computer program product includes a computer-readable storage medium bearing computer program code embodied therein for use with a computer. The computer program code, in response to execution by the computer, causes the computer to perform the following operations: accessing a permission that is to be revoked for an application, wherein the permission involves access to private data of a user via an application programming interface of an operating system; determining, in the application, one or more program points involving access to the private data of the user via the application programming interface; for each selected one of the one or more program points, rewriting code in the application to replace a source statement, at the selected program point, that accesses the private data with another statement that allocates a mock object or value based on a type of an actual value returned by the source statement, wherein the mock object or value does not expose the private data of the user; packaging the application with the rewritten code as an output application able to be subsequently executed by the user; and outputting the application with the rewritten code for use by the user.

An exemplary apparatus comprises: means for accessing a permission that is to be revoked for an application, wherein the permission involves access to private data of a user via an application programming interface of an operating system; means for determining, in the application, one or more program points involving access to the private data of the user via the application programming interface; means, responsive to each selected one of the one or more program points, for rewriting code in the application to replace a source statement, at the selected program point, that accesses the private data with another statement that allocates a mock object or value based on a type of an actual value returned by the source statement, wherein the mock object or value does not expose the private data of the user; means for packaging the application with the rewritten code as an output application able to be subsequently executed by the user; and means for outputting the application with the rewritten code for use by the user.

DETAILED DESCRIPTION

For ease of reference, this disclosure is divided into multiple sections. An overview is first provided, followed by a more detailed discussion.

Preliminary section: Overview and exemplary system

An overview is provided in this section. There are existing tools—built-in as well as external—to toggle app permissions. For an external tool, see XPrivacy. However, these tools do not provide any information on how permissions are used. It is up to the user to determine whether it is "safe" to revoke a permission, and what the implications would be on the runtime behavior of the app and the quality of its output. In fact, experiments with XPrivacy and other tools confirm that simply revoking permissions sometimes always leads the app to crash.

One exemplary idea of this disclosure is to enable users to disable permission-requiring aspects of an app selectively while still preserving the core functionality and behaviors of the app. Such aspects include, e.g., analytics, advertising, social computing, location-based services, enhanced authentication, integration with social networks, and the like. In an exemplary embodiment, a new and novel form of (e.g., dynamic) analysis is used to characterize how an application is utilizing sensitive system resources. The analysis in an exemplary embodiment disables permission-requiring aspects of an app selectively by "mocking" objects and their values, which retains app functionality but limits infringement of the user's privacy.

Figure 1:
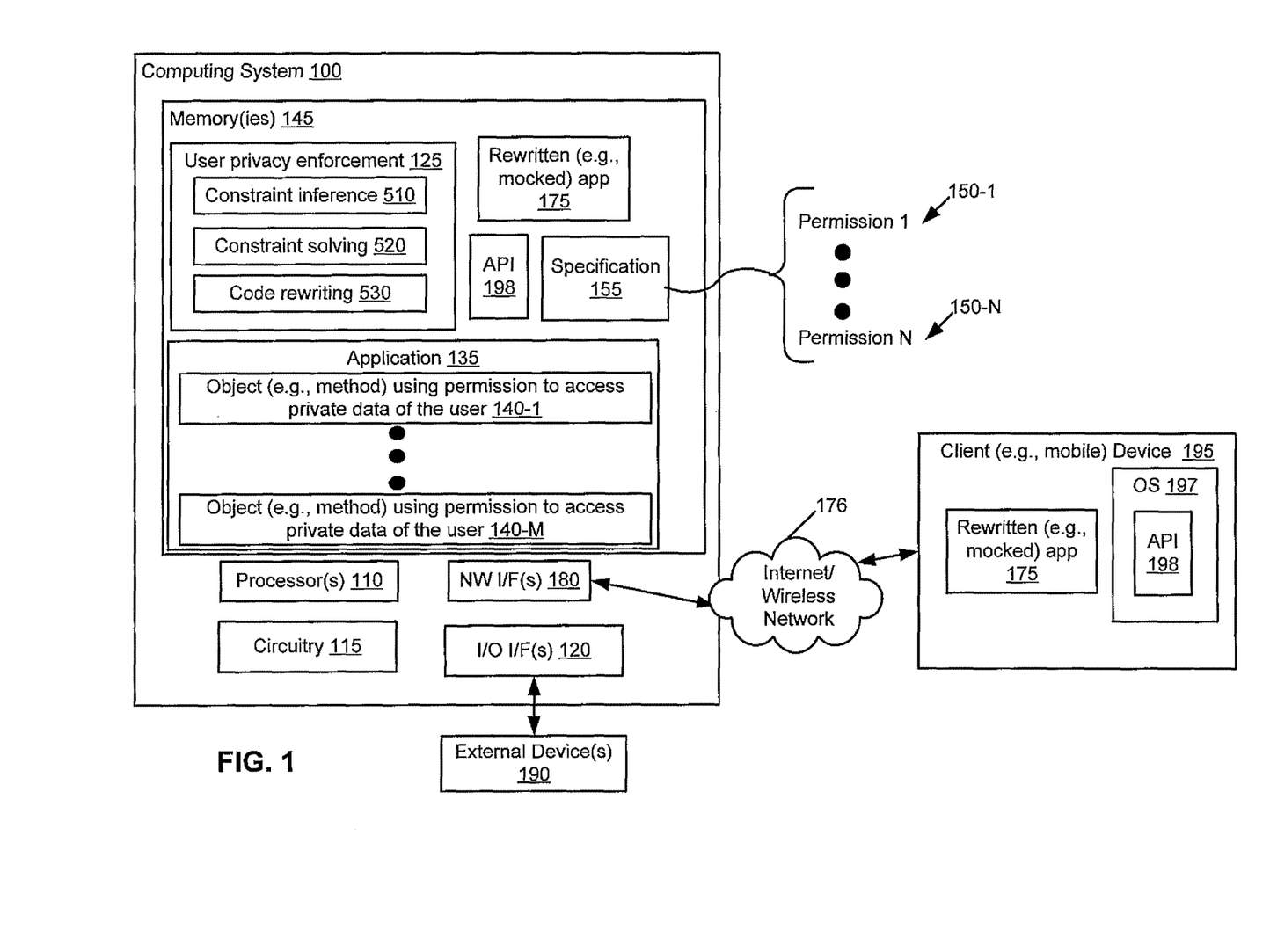
FIG. 1 is a block diagram of an example of a system suitable for performing the exemplary embodiments herein.

An introduction to techniques for allowing a user to have control over usage of sensitive resources is provided now in conjunction with FIG. 1. Turning to FIG. 1, a block diagram is shown of an example of a system suitable for performing the exemplary embodiments herein. A computing system 100 comprises one or more memories 145, one or more processors 110, circuitry 115, one or more network interfaces (N/W I/F(s)) 180, and one or more input/output interfaces I/O IF(s)) 120. The computing system 100 may also be connected to external devices 190, which may allow an administrator to access the computing system 100 via a mouse, touchscreen, display screen, or other output or input (as external devices). The memories 145 may comprise non-volatile and/or volatile RAM (random access memory), cache memory, NAND-based flash memory, long term storage (e.g., hard drive), and/or read only memory. The computing system 100 may also be a server and may be accessed remotely, e.g., through the Internet 176, which may be or include a wireless network. A user (not shown) connects to the Internet/wireless network 176 using a client device 195, which is typically a mobile device. A mobile device is wireless and portable, and typically is able to be picked up by a user, although this is not a requirement. The client device 195 has an OS (operating system) 197, comprising an API (application programming interface) 198, and has a rewritten app 175.

The one or more memories 145 of the computing system 100 comprise a user privacy enforcement process 125, a specification 155, an application 135, an API (application programming interface) 198, and a rewritten app 175. The user privacy enforcement process 125 includes three main processes in one exemplary embodiment, constraint interference process 510, constraint solving process 520, and code rewriting process 530. The application 135 includes a number of objects 140-1 through 140-N (e.g., methods of the objects) using a permission to access private data of the user. The accessing is performed via the API 198.

The specification 155 includes in this example a number of permissions 150-1 to permissions 150-N to be revoked. The permissions 150 to be revoked are indicated by a user, e.g., via a graphical user interface (not shown), e.g., such as a web browser interface, or via any other mechanism. The user wants to revoke the permissions 150 from the app 135 such that when the app executes on the client device 195, the app no longer can access private user data corresponding to the permissions.

The user privacy enforcement process 125 determines that a permission 150 is to be revoked for an application 135. As stated above, the permission 150 involves access to private data of the user via the API 198. The API 198 is for an operating system (OS) 197 as illustrated in client device 195. The user privacy enforcement process 125 rewrites code in the application 135, e.g., to replace source statements, at program points involving access to the private data of the user via the API, that accesses the private data with another statement that allocates a mock object. The allocation is based on a type of an actual value returned by the source statement, and the mock object does not expose the private data of the user. That is, calls to the objects 140 (or the methods of the objects) that use a permission to access private data of the user may be replaced with mocked calls that return data that do not expose the private data of the user. The private data of the user could be the IMEI (International Mobile Equipment Identity) of the client device 195, location of the user, phone number associated with the client device 195, and the like, and the corresponding mock objects meet requirements for the private data but do not expose the private data. For instance, a location might be a valid location on Earth (or even in a general vicinity of a user), but will not be the location of the user. The rewritten application 175 (also called a mocked app 175) is formed based on the application 135 and the rewritten parts of the application 135. Thus, when the user executes the rewritten app 175 by using the client device 195, the rewritten app 175 does not access the private data corresponding to the permissions 150.

Each permission 150 guards some private data of the user, such as the IMEI (International Mobile Equipment Identity) of the client device 195, location of the user, phone number associated with the client device 195, and the like. Each permission 150 is also expected to correspond to a permission to access sensitive system resources. Such permissions 150 may therefore correspond to permissions defined by an OS 197 such as Android. The examples below use the Android OS 197 as an example, but this is merely exemplary and the instant exemplary embodiments are not limited to Android. In Android programming, a permission is a restriction limiting access to a part of the data on the device. The limitation is imposed to protect critical data that could be misused to damage the user experience. Permissions may be declared in an application manifest for an application 135.

The user privacy enforcement process 125 may be implemented as computer-readable program code that is executable by the one or more processors 110 to cause the computing system 100 to perform one or more of the operations described herein. The processors 110 may be any processing units, such as digital signal processors and/or single-core or multi-core general purpose processors. In another example, the operations may also be performed, in part or completely, by circuitry 115 that implements logic to carry out the operations. The circuitry 115 may be implemented as part of the one or more processors 110 or may be separate from the one or more processors 110. The processors 110 may be any processing units, such as digital signal processors and/or single-core or multi-core general purpose processors. The circuitry 115 may be any electronic circuit such as an application specific integrated circuit or programmable logic.

Section 1: Motivating Examples

In this section, a number of motivating examples are introduced with code snippets taken from real-life applications available on the Android market. Android is a mobile operating system developed by Google.

Section 1.1: Tapjoy Advertisement Library

Figure 2:
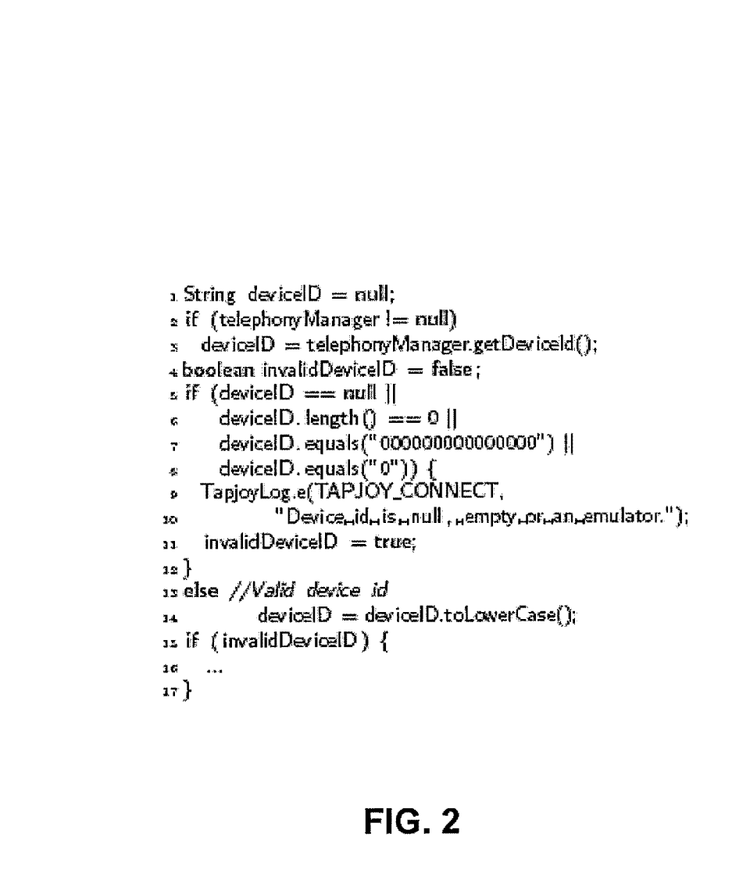
FIG. 2 is a code snippet from a method init( ) of class com.tapjoy.TapjoyConnectCore.

The snippet of code in FIG. 2 is part of the Tapjoy library, a widely used mobile application advertising and publishing platform. When this library initializes its core connection component, the library reads the device identifier and performs some checks in order to discover if the device identifier is mocked. In this case, the library creates an ad hoc random identifier, and tracks the device through the use of the identifier. Once created, this special identifier is permanently stored in the device, and the identifier is used again in the next executions of the application. In this way, the Tapjoy library can track the device through various executions even if the library uses a standard mocked identifier.

The device identifier is particularly important for Tapjoy since the identifier allows the application to track exactly what the user does. For this reason, the library considers as mocked some specific identifiers (that is, a null value, the empty string, "0", and "000000000000000") that are usually adopted by systems such as)(Privacy. In order to call method getDeviceId( ) the application has to require the READ_PHONE_STATE permission. When we revoke this permission with techniques used herein, we need to substitute the method call with a constant value, but we would also like to avoid executing the code in line 11 since this will anyway allow the program to track the user. The error logging (TapjoyLog.e) in this branch indicates that this piece of code deals with an exceptional scenario that we would like to avoid.

This example shows that we need a specific mocking strategy for a given program. In the instant disclosure, the term "mocked" means "to imitate or resemble closely". A mocked object or value should not allow the program to identify and track the user, and therefore does not expose private data of the user. In this particular case, for this program we want to avoid the "then" branch (line 3) of the first "if" statement. An automatic strategy that, given a program, builds up a specific mocking value, prevents this specific program from tracking the user. In addition, if a future release (that may take into account a constant value built to avoid this current version of the program) discovers the mocked value and adds the mocked value to a black list, a new constant value will be created using techniques described herein when applied to this new version of the program.

Section 1.2: Current Caller ID & Block

Figure 3:
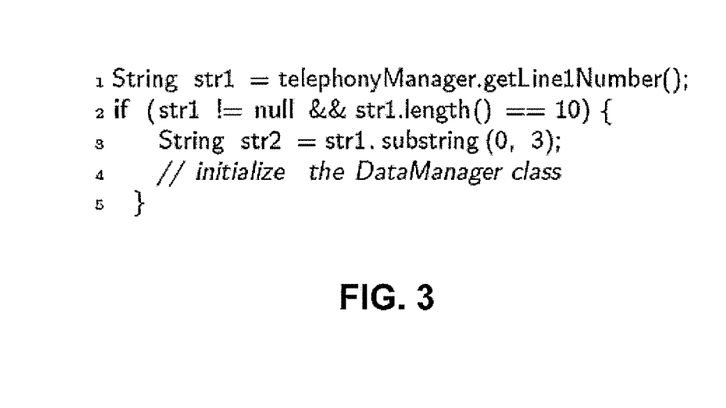
FIG. 3 is a snippet of code from DataManager.

Consider now the code in FIG. 3, which is a snippet of code from DataManager, from the Current Caller ID & Block application, one of the most popular free applications in the United States. This code is aimed at initializing the fields of class com.whitepages.scid.dataDataManager. Note that the code of this app is heavily obfuscated, and therefore the methods names do not have any semantic meaning.

The main functionality of the app is to block calls from numbers that are not in the contact list, but the app requires the permission READ_PHONE_STATE to access the IMEI (International Mobile Equipment Identity) and the phone number of the device. In particular, the code in FIG. 3 accesses the phone number through TelephonyManager.getLine1Number( ) and, if this phone number is made by 10 characters, the code extracts the area code, and initializes all the fields of the DataManager class in a proper way. The code is robust and does not throw any exception since the code checks if the value returned by the method is not null before accessing the method, but in order to activate the full functionality of the app, the code needs to receive a 10 digit phone number. While) XPrivacy returns always a constant string made by 6 characters, the techniques herein are used to mock a 10 digit string enabling all the main functionalities of DataManager. That is, the String str1 is set to a 10 digit number (but not the user's phone number). This happens since the mocked resource is used inside the "then" branch to extract the area code of the phone number, and this leads to production of a good constraint requiring that the phone number is not null and made by exactly ten digits.

Section 1.3: White Pages

Figure 4:
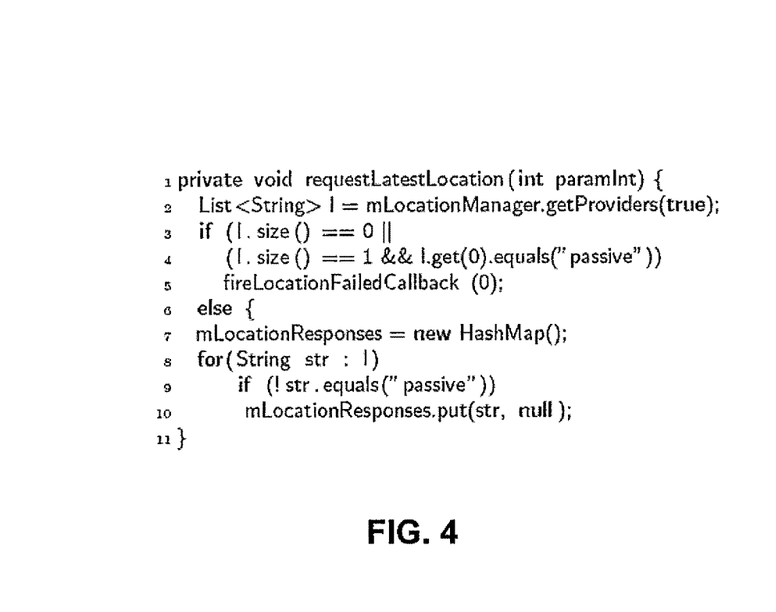
FIG. 4 is a running example.

Consider the code snippet in FIG. 4, taken from class com.whitepages.geoservices.LocationHelper of the White Pages application. This class contains some private fields: mLocationManager of type LocationManager stores a location manager used to retrieve location providers, whereas mLocationResponses of type HashMap<String, Location> is used to store the last location retrieved by each location provider (identified by a string). Method requestLatestLocation iterates over all the location providers, and if the method finds a non-passive provider, the method adds the provider's identifier to mLocationResponses. In case the list of providers is empty or contains only one passive provider, requestLatestLocation signals that it failed to find a location provider. Once a provider's identifier flows into mLocationResponses, then the identifier is used later (through some listeners) to add fresh locations into this map, and these locations are further used by the application.

Method getProviders requires the LOCATION permission. If one wants to revoke this permission, one needs to mock in some way the list of providers that is returned by getProviders. Ideally, we would like to mock a list that preserves the rest of the functionality of the application. For this particular method, this requires one to generate a list of providers containing at least a non-passive provider, so we populate mLocationResponses, and this will activate the main functionality of the application dealing with locations.

Section 2: Technical Overview of Certain Exemplary Embodiments

In this section, we summarize the main steps of an exemplary approach, which we highlight in FIG. 4. An exemplary embodiment starts from a permission to be revoked (e.g., access to the IMEI or location) and an Android application requiring that permission (e.g., accessing the IMEI through getDeviceId( )).

Figure 5:
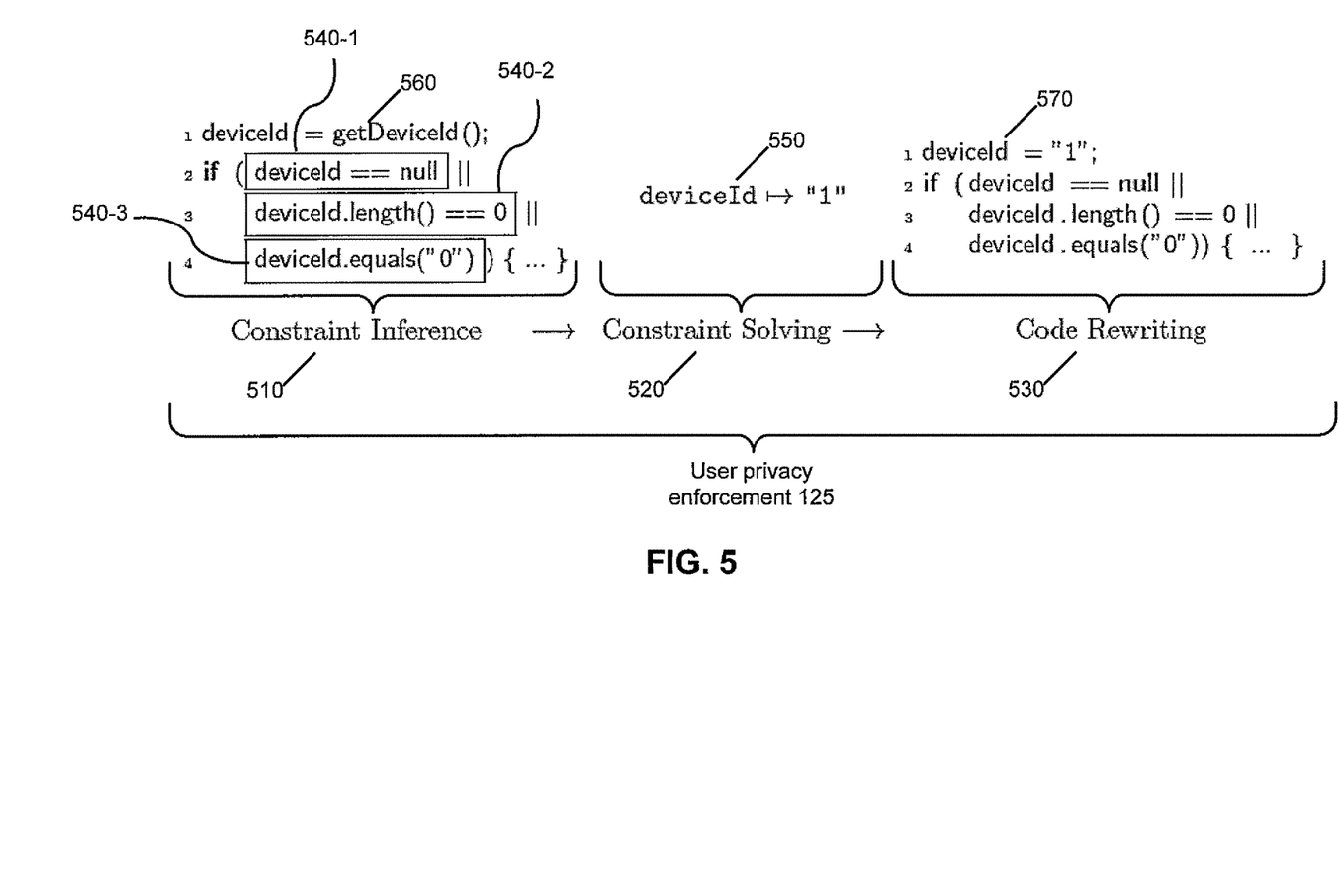
FIG. 5 is a high-level overview of an exemplary embodiment.

The first step (constraint inference process 510 of the user privacy enforcement process 125) is to analyze the Android app and infer constraints over the values produced by API (Application Programming Interface) calls guarded by the given permission. In FIG. 5, these correspond to the boxed statements 540-1 through 540-3). These constraints are aimed at avoiding from transitioning into bad program locations (e.g., "throw" statements) and preferably also maximizing functionality in the absence of the actual private value. During the second step (constraint solving process 520 of the user privacy enforcement process 125), the inferred constraints are solved to obtain concrete mocked values (e.g., statement 550, deviceID→"1"). Finally, the API calls guarded by the given permissions are replaced by the mocked values (e.g., statement 560, deviceId= getDeviceId( ) is replaced by statement 570, deviceId="1"). In this section, we will refer to the code snippets in FIGS. 2 and 4 also to illustrate the technical discussion.

Section 2.1: Constraints Inference 510

The first step is to characterize how the application accesses resources. While in theory the application may perform full validation of the values the application obtains, thereby complicating attempts to mock the actual value, in practice checking is often limited to certain specific tests as illustrated in Section 1 above with real-world examples. At the same time, validation tests often vary across applications. As an example, one app may check the IMEI to verify that the app is not running atop an emulated environment (wherein the IMEI is a string of '0's, as in the Tapjoy example above), while another app may validate manufacturer information (encoded into the IMEI prefix). In light of this observation, there is the need for a specialized (i.e., per-app) strategy for mock synthesis.

The first order of business is to collect sufficient constraints to avoid "bad executions", wherein the application crashes or error-handling code (such as writing to the error log) is executed in place of the core functionality. Concretely, consider a code path as being bad if the path leads to a bad location: a program point where (i) an exception is thrown, or (ii) a well-known error-handling method is invoked. In FIG. 2, TapjoyLog.e( ) is called, which in turn invokes the built-in android.util.Log.e( ) error-logging method, thereby rendering the constraints listed above—of synthesizing a mock value that is non-null, not empty and not a sequence of 1 or 15 zeroes—necessary.

Beyond avoiding bad constraints, which is essential in an exemplary embodiment, our method attempts to synthesize a mock object or value that "maximizes" the core functionality. That is, while there are different possible values that guide execution away from error handling or crashing, in practice these values are not equally good. Some lead to a more complete execution of the application's business logic than others.

As an illustration, we refer to FIG. 4, where a list of location providers is obtained via the getProviders( ) call. The first step, as with Tapjoy, is to avoid bad constraints. Though these are not visibly present here (fireLocationFailedCallback( ) neither throws an exception nor calls built-in error-handling methods), there is an implicit constraint: The value of the List object 1 must not be null. Otherwise, the size( ) call on this object would result in a null-dereference exception (NullPointerException in Java). Java is a programming language used to develop applications, especially ones for the Internet, that can operate on different platforms. The constraint inference process 510 accounts for such implicit constraints.

While simply returning a non-null yet empty List object is sufficient to avoid a bad execution, the "else" branch would not get executed. This branch is noticeably preferable to the "if" branch, as motivated in Section 1.3. A concrete way of capturing this, which the constraint inference process 510 applies, is to consider uses of the private data values along different code paths. Intuitively, given two paths that are both good, if one of the paths makes more use of the obtained value, then it is more likely to perform the actual logic that depends on that value. In FIG. 4, the variable 1 is used within the loop structure inside the "else" branch, and so executing the loop is preferable to skipping the loop, which implies that the variable 1 should not be empty.

Section 2.2: Constraint Solving Process 520

An exemplary goal of constraint solving is to satisfy as many as possible of the good constraints (which capture the conditions that force execution along a good path) while simultaneously refraining from violating any of the bad constraints (which ensure that bad execution paths are avoided). A unified representation of both types of constraints that reflects this goal is achieved by assigning weights to constraints: A good constraint in an exemplary embodiment has a unit weight of 1 (one), whereas a bad constraint has weight $\infty$. Next, the constraint solving process 520 heuristically partitions the constraints into clusters according to the conflict relation. Given two constraints c1 and c2, the conflict relation detects if the two constraints are surely conflicting, that is, c1 AND c2 is false. By relying on this relation, we build up clusters of constraints that are not surely conflicting. A given cluster ideally contains constraints that are mutually consistent. In practice, the constraint solving process 520 deliberately under approximates the conflict relation, making it possible for a given cluster to contain contradictory constraints.

The reason for under approximating the conflict relation is to potentially obtain an optimal solution. The supporting reasoning is that with the conflict relation under approximated, the cluster contains a superset of the maximal set of mutually consistent constraints. Thus, if the constraints in the cluster are consistent, then a maximal set of mutually consistent constraints has been discovered. In this case, the mocking solution computed by the constraint solver simultaneously avoids all the bad constraints while maximizing functionality per the good constraints. Our experimental findings show that in well over 80 percent of the cases, the techniques used herein are indeed able to converge on a fully optimal mock implementation.

In the minority of other cases, the second-largest cluster is tried, and so on, until we obtain suboptimal mocking data. Note that failure to obtain any solution is an indication that regardless of the values of the private resources the program reads, the program's execution is abnormal (reaching either an exceptional state or some form of error handling). We have not found any such cases in practice.

The concrete values obtained as a solution to the constraint system are guaranteed to at least avoid the bad locations (i.e., exception-raising and error-handling code). Back to our examples, a solution for Tapjoy that avoids the bad constraints is "1" as device identifier, while for the example in FIG. 4 we would obtain a list containing one location provider whose name is an empty string.

Section 2.3: Code Rewriting Process 530

The third and final step, having collected the constraints and found a solution that is consistent with at least the necessary constraints to avoid bad locations, is for the code rewriting process 530 to impose the mock implementation on the original code. This is achieved via application-level code rewriting at the level of bytecode rewriting.

The code rewriting process 530 replaces the source statement (i.e., the statement accessing the private data) with another statement that allocates a mock object based on the type of the actual value returned by the statement. For instance, the telephonyManager.getDeviceId( )call at line 3 of the Tapjoy example (FIG. 2) is replaced with "1", while mLocationManager.getProviders(true) at line 2 of FIG. 4 is replaced by a singleton list (of type List<String>) containing the string "".

Section 3: Abstract Semantics

One exemplary goal of our system is to compute an input value that (1) does not expose any input-dependent bad executions, and (2) exposes as many good program points as possible. It is noted that this section details one specific exemplary embodiment, but the techniques herein are not limited to this specific embodiment.

Section 3.1: Abstraction of Inputs

In the concrete domain, we identify inputs by their identifiers (Inp) and a time stamp (Time) to represent inputs that may vary during the execution. While we suppose that Inp is finite, Time is not, and we need to abstract the time stamp in order to build up a computable static analysis. In particular, for variable inputs (e.g., locations in Loc) our analysis abstracts, through the same symbolic identifier, all the inputs generated at the same program point. Therefore, we symbolically represent an input through a pair in Inp× Lab. Lab represents the set of program points (or program labels). In this way, we can infer a set of constraints over these symbolic identifiers. If we find a solution, then we replace the input value with the concrete value corresponding to the solution.

Note that in certain cases, input values corresponding to a given program point may change over time (e.g., the onLocationChanged( ) callback). The mock value computed by our system, on the other hand, remains the same across all evaluations of the given program point. This potential discrepancy is addressed conservatively by ensuring that the value we produce leads to execution along a good path, and in particular, away from any bad path. The constraints we specify are global, across all possible program states in which the given program point is executed, to achieve this guarantee.

Concerning the running example from FIG. 4, in the running example of Section 1.3, we symbolically represent the list of providers read at line 2 with R.

Section 3.2: Constraint Inference

An exemplary analysis aims at inferring constraints that are strong enough in order to avoid a bad program point or execute a good program point. Therefore, given a program p and a program point 1, we apply a standard weakest-precondition calculus to infer the constraint c that has to be satisfied by the input of p to reach 1. Since the weakest-precondition calculus (see XPrivacy at www.xprivacy.eu; P. Cousot, "Constructive design of a hierarchy of semantics of a transition system by abstract interpretation," Theoretical Computer Science, 277(1):47-103; and P. Cousot and R. Cousot, "Abstract interpretation: a unified lattice model for static analysis of programs by construction or approximation of fix-points", In Proceedings of POPL '77, ACM, 1977) infers the weakest constraint that is sufficient in order to reach 1, we have that:

$$\forall in \in InpEnv : evalC(c, in) \Leftrightarrow \forall \tau \in S[\![p, in]\!] : 1 \in \tau, \quad (1)$$

where evalC is a function that, given a constraint over the input and an input evaluation, returns "true" if and only if the given input evaluation satisfies the given constraint. The variable c is a Boolean condition over the input values. InpEnv is the set containing all the possible evaluation of inputs of the program (e.g., all the possible existing IMEIs). S is the concrete semantics that, given a program and an input evaluation, returns the execution trace. The variable τ is this execution trace. The statement 1 ∈τ means that the execution trace τ contains the program label 1, that is, the program label is executed. The statement evalC(c,in) means that the Boolean condition c is true when evaluated with in.

Our constraints may contain methods and fields of the resource. Here, we impose the assumption that methods of the resource return a constant, fixed value, ignoring the values of the argument. Note that this is not an unsound assumption, since the resource in our constraints represents the mocked object that we want to find, not the real resource in the original program. However, our technique may fail in places where a solution exists by inferring an unsatisfiable constraint, that is, a resource that cannot be mocked in a way that avoids bad behavior.

An expression that refers to the resource, but whose value is not fully determined by the mocked resource (mostly, when the value is a parameter to an API function), is replaced by a universally quantified variable. Expressions that do not contain the resource and whose value is not known to be a constant value are replaced by an existentially quantified variable.

Unfortunately, the weakest-precondition calculus may not converge in the presence of loops and recursion, since the number of terms is potentially unbounded. Therefore, we bound the number of iterations of loops and of recursive calls. In this way, we obtain a constraint c' weaker than c. This implies that $$\forall in \in InpEnv : evalC(c, in) \Rightarrow evalC(c', in) \quad (2)$$

By combining Equations 1 and 2, we obtain that:

$$\forall in \in InpEnv : evalC(c', in) \Leftarrow \forall \tau \in S[\![p, in]\!] : 1 \in \tau \quad (3)$$

For a good program point, we are interested in proving that, given a constraint, we expose executions that contain the good program point. Instead, for a bad program point, we are interested in constraints that ensure that, if satisfied, the bad program point is never executed.

Therefore, given a program p and a program point 1, through our weakest-precondition calculus, we obtain a constraint c that satisfies the soundness requirement of avoiding bad locations, as follows.

Lemma 1. Given program p and constraint c computed by the techniques presented herein for arriving at a bad location 1, the negation ¬of this constraint guarantees that 1 will never be reached.

Sketch. If we negate c from Equation 3, obtaining , ¬c, then we arrive at the following implication relation:

$$\forall in \in InpEnv:evalC(\neg c',in) \Rightarrow \forall \tau \in \mathbb{S}[\![p,in]\!]:1 \not\in \tau$$

Intuitively, this result is due to the fact that a bad program point is reached due to a conjunction of conditions. If at least one of these conditions is negated, then the bad program point is avoided. This means, pleasingly, that even if not all of the conditions for reaching a bad program point can be modeled precisely (or even collected), as in the ideal case in Equation 2, we can still guarantee that a bad program point is avoided.

Beyond the soundness requirement asserted above, we state below a stronger result, guaranteeing that a good location is visited under the assumption that the path leading to the good location is free of loops and recursive calls.

Lemma 2. Given program p, input access statement a and good location 1, assume that the chop of a and 1 (i.e., the intersection between the forward slice from a and the backward slice from 1) is loop and recursion free. Then if the techniques herein are able to generate a mock value, that value is guaranteed to drive execution through 1 on every run that visits a.

Sketch. The tight guarantee with respect to a loop- and recursion-free chop follows from the fact that collects precise constraints along the slice up to a bound on the number of collected constraints. This is to guarantee termination, as otherwise the number of constraints can grow unboundedly. Since absence of loops and recursive calls guarantees that only a finite number of constraints will be collected, no precision is lost. A solution by the techniques presented herein is, therefore, a mock value that models all the requisite constraints to arrive at the good location.

Returning to the running example of FIG. 4, the bad locations at lines 3 and 4 that implicitly throw a NullPointerException are reachable either if l==null or if l.get(0)==null. Since we represent the list of providers generated at line 2 as R, these constraints take the form R≡null and R.get(0) ≡null, respectively. Their negation leads to R ≠null and R.get(0) ≠null, respectively.

About good locations, the usage at line 3 is unconstrained. The next access, 1.size( )==1, is guarded by R.size( )≠0 (i.e., negative evaluation of the first disjunct). Similarly, 1.get(0). equals("passive") is guarded by R.size( )≠0∧R.size( )≡1. Last, the usage at line 8 is executed under the else branch, and so it is guarded by R.size( )≠0∧(R.size( )≠1∨¬R.get (0).equals("passive")).

Section 3.3: Iterative Constraint Solving

One aim is to maximize the number of good program points that are always executed with the given input value. Therefore, for each label 1 ∈ IDgood (p,id) representing an input-dependent program point, we infer a constraint (through the same weakest-precondition calculus adopted for input-dependent bad program points) $c_g^t$.

As pointed out in the concrete semantics, the conjunction $c_g = \wedge_{1 \in IDgood(p,id)} c_g^t$ may not be satisfiable, since it potentially contains contradictory clauses. Following our goal of reaching as many good locations as possible, we try to find an assignment to the variables in our constraint systems, such that ¬$c_b$ is satisfied and as many as possible of the constraints $c_g^t$ are satisfied. This is reducible to a MAXSMT problem, where ¬$c_b$ has the weight ∞ and each $c_g^t$ has weight 1. Concerning the MAXSMT problem, see Robert Nieuwenhuis and Albert Oliveras, "On SAT Modulo Theories and Optimization Problems", A. Biere and C. P. Gomes (Eds.): SAT 2006, LNCS 4121, pp. 156-169, 2006, printed by Springer-Verlag Berlin Heidelberg.

A problem of this form can be solved by a simple albeit expensive iterative algorithm, which—in the worst case—tests the satisfiabiliy of every possible subset of $\{c_g^t | l \in IDgood (p,id)\}$ in conjunction with $c_b$, and returns the largest satisfiable subset. However, even if implemented in an efficient fashion, this algorithm is prohibitively expensive.

The particular structure of our constraints allows us to derive a much faster, though approximate, algorithm. The guiding intuition is that often contradictions between good constraints can be detected straightforwardly at the syntactic level. For example, given program $$if(c)then[\ldots]^{g1}else[\ldots]^{g2},$$

and good locations $g_1$, $g_2$, we obtain the constraints c and ¬c, which are visibly contradictory.

An exemplary algorithm, which exploits this property, is based on the idea of computing a syntactic under-approximation, $\widehat{\otimes}$, of the conflict relation over constraints:

$$c_1 \widehat{\otimes} c_2 \Rightarrow \exists \sigma. \sigma \models C_1 \wedge C_2.$$

We do not give a detailed definition of $\widehat{\otimes}$ here, as it is defined on several syntactic properties of the constraints that can be easily extended or replaced. Using $\widehat{\otimes}$, we define an algorithm that clusters a set of constraints accordingly, as specified in FIG. 6.

Lemma 3. Let $\{c_i\}_{i \in I}$ be the clusters due to the algorithm in FIG. 6 over the entire set of constraints. Then if a solution is found by the solver for a given cluster $c_i$, then that solution is optimal.

Figure 6:
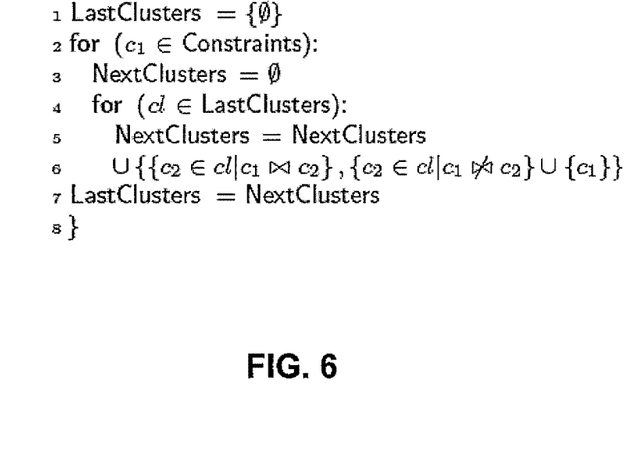
FIG. 6 is a constraint clustering algorithm.

Sketch. $\widehat{\otimes}$ is a (syntactic) under-approximation of the true conflict relation. Thus, each cluster $c_i$ is guaranteed to contain a maximal set of mutually consistent constraints. If the solver finds a solution for a given cluster $c_i$, then we are guaranteed that all the constraints in $c_i$ are consistent with each other. This implies, therefore, that $c_i$ itself is a maximal set of mutually consistent constraints, where a solution for a maximal set of constraints is an optimal solution.

Returning to the running example, as described in section 3.2, we infer R≠null∧R.get(0)≠null as ¬$c_b$, as well as the following good constraints in $c_g$:

R.size( ) ≠0;
R.size( ) ≠0∧R.size( )=1;
R.size( ) ≠0∧R.size( )≠1; and
R.size( ) ≠0∧R.size( )=1∧¬R.get(0).equals("passive").

Section 4: Exemplary Implementation Details

Figure 7:
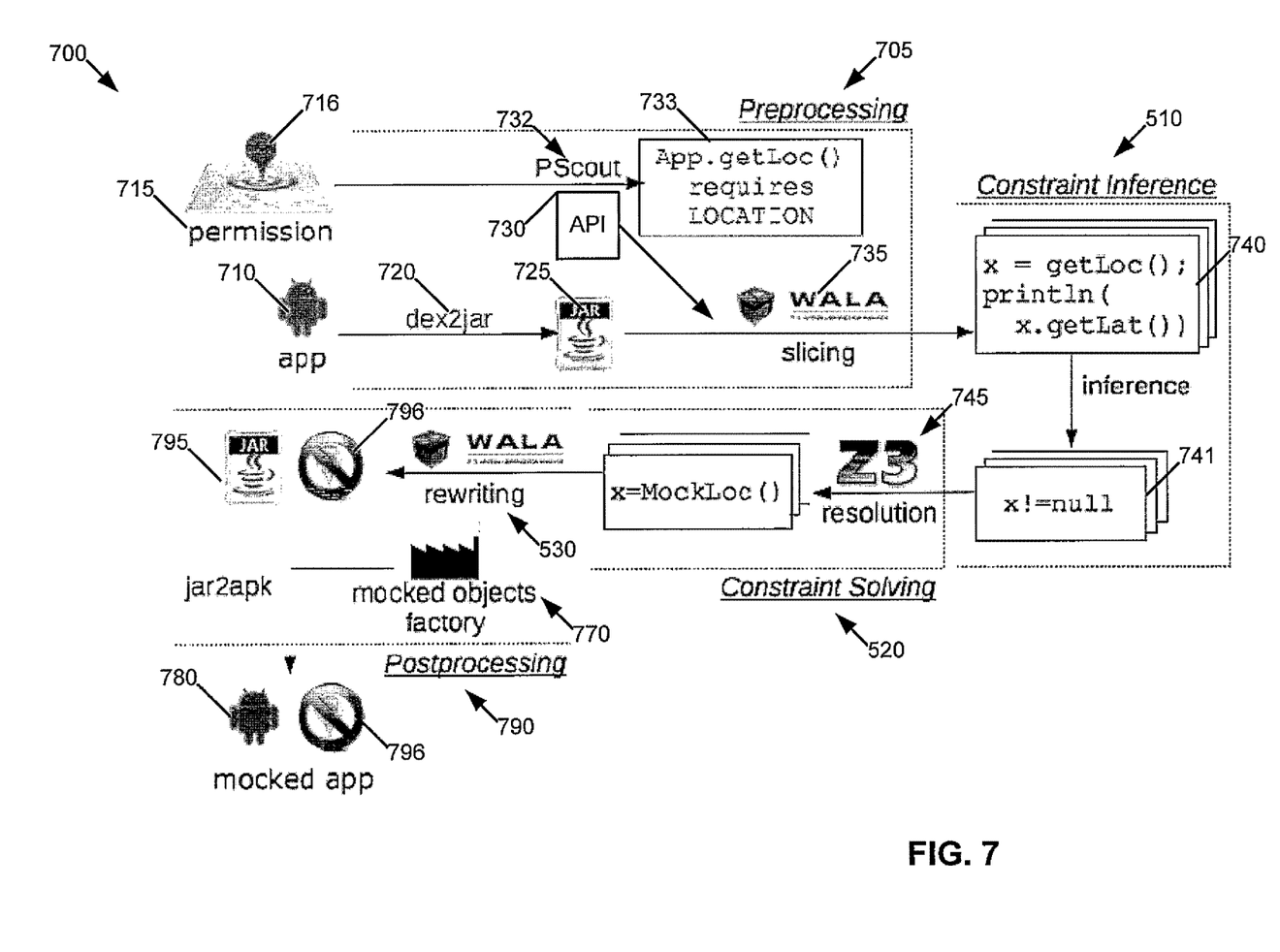
FIG. 7 is a block diagram used to illustrate exemplary implementation details of one possible system.

FIG. 7 summarizes exemplary implementation details of one possible system 700. The processing steps of constraint inference process 510, constraint solving process 520, and code rewriting process 530 from FIG. 5 are shown on FIG. 7. This example includes preprocessing 705 and postprocessing 790. The system 700 receives as input (i) an Android application 710, e.g., as Dalvik bytecode and (ii) a permission 715 to be revoked. The Android application 710 is one possible example of an application 135 from FIG. 1. The permission can be, e.g., one of the permissions 150 in the specification 155 (see FIG. 1). The output 795 is a transformed version of the input application 710 that does not require the input permission. The exemplary system 700 comprises four (e.g., main) pieces of functionality, which we describe in the following in turn.

Section 4.1: Preprocessing

Given the compiled Android application 710, we retarget the Dalvik bytecode to JVM bytecode with the help of the dex2jar tool 720. As is known, Dalvik is a process virtual machine in Google's Android operating system, which executes applications written for Android. Programs are commonly written in Java and compiled to bytecode for the Java virtual machine, which is then translated to Dalvik bytecode and stored in ".dex" (Dalvik EXecutable) and ".odex" (Optimized Dalvik EXecutable) files. In this example, the Dalvik bytecode is converted to a compressed Java archive (JAR) via a dex2jar tool 720. The resulting JAR file 725 is then loaded into WALA together with an unimplemented version of the Android API 730, which is one possible API 198 (see FIG. 1). The T. J. Watson Libraries for Analysis (WALA) provide static analysis capabilities for Java bytecode and related languages. The Android API 730 contains all methods that are publicly accessible to application developers, but no implementations. This JAR is standardly used during Android Development.

From the two JAR files 725, 730, we generate intra-procedural control flow graphs, and atop these a global call graph. We then use built-in WALA facilities to compute a pointer analysis and generate an interprocedural program dependence graph (see S. Horwitz, T. Reps, and D. Binkley, "Interprocedural slicing using dependence graphs", in proceedings of PLDI '88, pages 35-46, ACM (1988)), which serves for slicing.

The permission 715 is used for a PScout process 732, which produces a permission/API mapping 733. The icon 716 indicates the permission 715 corresponds to location. PScout is described in Kathy Wain Yee Au, et al., "PScout: Analyzing the Android Permission Specification", in the Proceedings of the 19th ACM Conference on Computer and Communications Security (CCS 2012) (October 2012). PScout is a tool that extracts the permission specification from the Android OS (Operating System) source code using static analysis. In this example, the PScout processing produces the permission/API mapping 733 of "App.getloc( )requires LOCATION".

Section 4.2: Constraint Inference

This section concerns an example of constraint inference process 510. Relying on the permission/API mapping 733 provided by PScout 732, we identify the set S of program points requiring a given permission (that is, the program points calling a method related to the given permission in the PScout mapping).

We compute a context-sensitive forward thin slice (see E. W. Dijkstra, "Guarded commands, nondeterminacy and formal derivation of programs", Commun. ACM, 18(8):453-457 (1975)) with WALA starting from each program point in S. From the resulting slice, we collect all program locations that are marked as either bad or good.

In this exemplary implementation, we consider as bad all locations that (i) throw an exception directly using a throw instruction; or (ii) make a call to an Android method that may throw an exception under certain circumstances. Good locations, on the other hand, are those that make use of the resource. While there are other conceivable heuristics to quantify resource-dependent functionality (e.g., according to the overall number of reachable methods/statements or by marking designated APIs as good locations), manual scrutiny of examples from the "wild" has shown that counting uses of the resource works highly effectively in practice.

Each of the good and bad locations $\ell$ serves as the seed of a backward analysis that computes the set E of constraints that must be satisfied by the values returned by the method requiring the permission in order to reach $\ell$. This is mostly a bounded application of the assignment rule of weakest-precondition calculus, as described in Section 3 above. The backward analysis is path sensitive, and is implemented as an IFDS (Interprocedural Finite Distributive Subset) problem (see T. Reps, et al., "Precise interprocedural dataflow analysis via graph reachability", in Proc. of the 22nd ACM SIGPLAN-SIGACT Symposium on Principles of Programming Language), which we discharge to the WALA IFDS solver.

In this example, the constraint inference process 510 operates on the app snippet 740 (of "x=getLoc( ); println (x.getLat( ))") to determine the inference 741 of "X!=null".

Section 4.3: Constraint Solving

This section concerns constraint solving process 520. We then try to iteratively solve the constraint system. In particular, the solution in an exemplary embodiment has to satisfy the negation of the constraints corresponding to bad locations (e.g., we have to ensure that no exception is thrown due to the mock values), and is further biased to maximize satisfaction of constraints to reach good location (in order to enable as much of the core functionality as possible in the absence of the actual resource). This process is explained in Section 3.3.

The constraints are all encoded into SMT-LIB (Satisfiability Modulo Theories-Library) form and fed into a constraint solver. Specifically, the constraint solving process 520 makes use of the Z3 string theory. See K. W. Y. Au, et al., "PScout: Analyzing the android permission specification", in Proceedings of CCS '12, ACM Press (2012); and A. P. Felt, et al., "Android permissions demystified", in proceedings of CCS '11, ACM (2011). The Z3 string theory can handle (i) numerical constraints, (ii) string constraints (string equality, numerical constraints over the string length and the predicates StartsWith and EndsWith), and (iii) subtyping constraints (and in particular, checking if a given object is of a given type). In this example, the constraint solving determines "x=MockLoc( )", which is a method that provides a mocked location.

Section 4.4: Postprocessing

This section describes the postprocessing 790, which includes code rewriting process 530. The exemplary solution being described provides us with the values that can be used to replace the method calls requiring the permission. Therefore, we modify the bytecode via rewriting 530 (performed by WALA) and consequently obtain a new JAR file 795. As indicated by the icon 796, the permission to determine a location has been revoked.

To simplify synthesis of mock values, the rewriting process 530 has available factory methods (illustrated by mocked objects factory 770) for different types of private values, including, e.g., Location (e.g., a data class representing a geographic location) and WifiInfo (e.g., a class that describes the state of any Wifi connection that is active or is in the process of being set up). These are packaged as Java libraries, which rewriting process 530 injects into the classpath of the target application to enable usage of the factory methods from within application code. The factory methods expose parameters per the constraints the solver may compute (e.g., setting a particular value for the Location object's longitude or latitude fields). When possible, the factory method outputs a fresh instance of the same type as the original object returned by the source method. Otherwise, if the original type is not sufficiently customizable, then subtyping is used to ensure that typing constraints are preserved.

Finally, the instrumented Java bytecode is converted back to Dalvik (again, using jar2dex), and then injected into the original APK (which may also include a manifest file and other files). The Android application package (APK) is a package file format used to distribute and install application software and middleware onto Google's Android operating system, and certain other operating systems. We then overwrite the APK's manifest file, removing the revoked permission from the list of requested permissions. As is known, the manifest file presents essential information about an application to the Android system. The manifest file declares which permissions the application must have in order to access protected parts of the API and interact with other applications. Lastly, the system signs the resulting APK to enable its installation and deployment. The output is the mocked app 780, which is indicated by the icon 796 to have revoked permissions to the user's locations.

Figure 8:
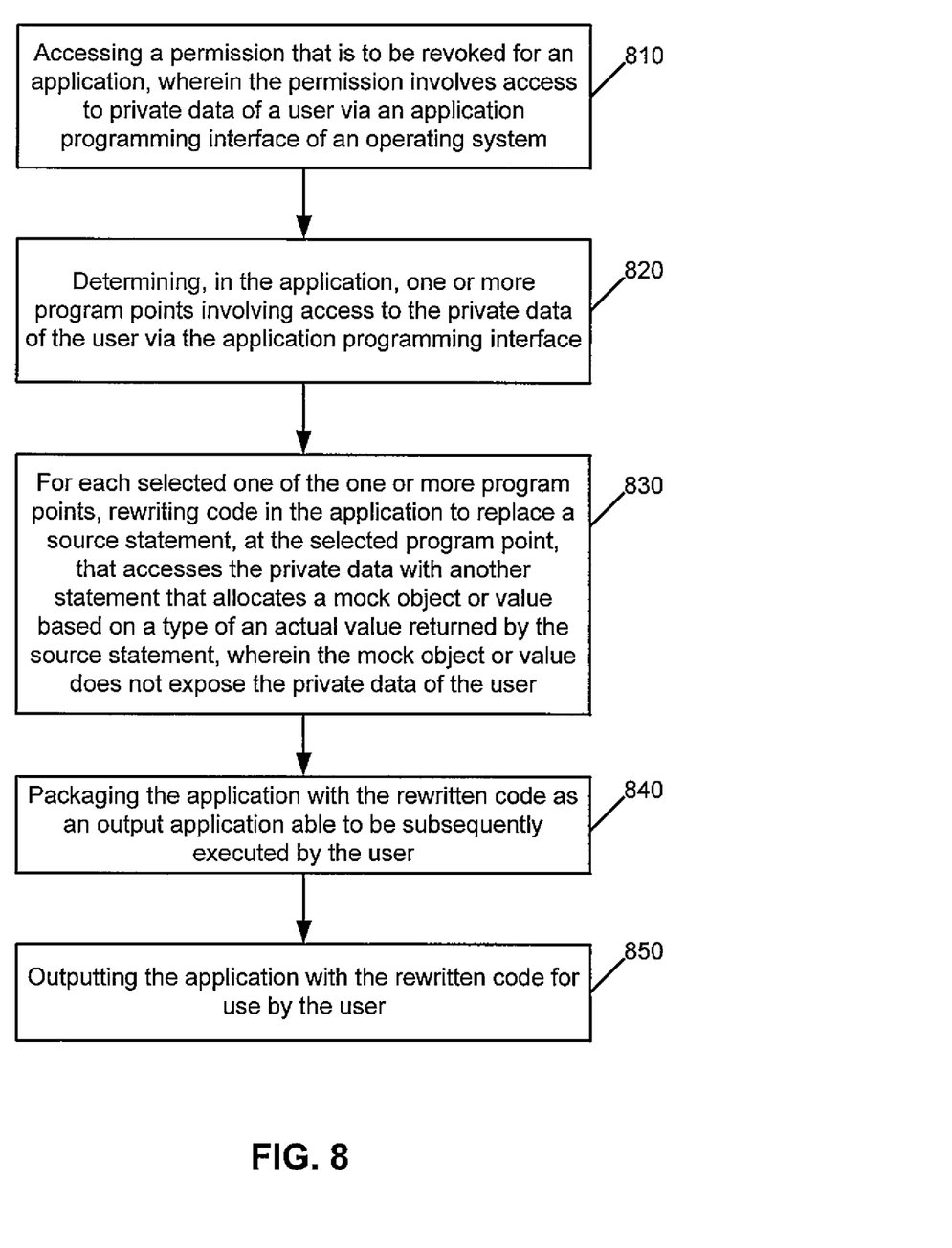
FIG. 8 is a process for fine-grained user control over usages of sensitive system resources having private data with applications in privacy enforcement, and illustrates the operation of an exemplary method, a result of execution of computer program instructions embodied on a computer readable memory, functions performed by logic implemented in hardware, and/or interconnected means for performing functions in accordance with exemplary embodiments.

Turning to FIG. 8, this figure is a process for fine-grained user control over usages of sensitive system resources having private data with applications in privacy enforcement. FIG. 8 further illustrates the operation of an exemplary method, a result of execution of computer program instructions embodied on a computer readable memory, functions performed by logic implemented in hardware, and/or interconnected means for performing functions in accordance with exemplary embodiments. FIG. 8 is assumed to be performed by computing system 100, e.g., under control at least in part by the user privacy enforcement process 125.

In block 810, the computing system 100 performs the operation of accessing a permission that is to be revoked for an application. The permission involves access to private data of a user via an application programming interface of an operating system. In block 820, the computing system 100 performs the operation of determining, in the application, one or more program points involving access to the private data of the user via the application programming interface. The computing system 100, in block 830, for each selected one of the one or more program points, performs rewriting code in the application to replace a source statement, at the selected program point, that accesses the private data with another statement that allocates a mock object or value based on a type of an actual value returned by the source statement. The mock object or value does not expose the private data of the user. That is, calls to the objects 140 (or the methods of the objects) that use a permission to access private data of the user may be replaced with mocked calls or corresponding values that return data that do not expose the private data of the user. In block 840, the computing system 100 performs packaging the application with the rewritten code as an output application able to be subsequently executed by the user. In block 850, the computing system 100 performs the operation of outputting the application with the rewritten code for use by the user.

In another exemplary embodiment, an apparatus is disclosed that includes means for accessing a permission that is to be revoked for an application, wherein the permission involves access to private data of a user via an application programming interface of an operating system. This means may be performed by one or more processors 110 and/or circuitry 115 controlling the computing system 100 to perform the means. The means may be algorithms as described above, e.g., in reference to sections 2-4. The means for accessing may also include a memory controller that reads a memory/multiple memories 145, the NW I/F(s) 180 that receives a permission via a wired and/or wireless interface, a GUI, or the like. The apparatus includes means for determining, in the application, one or more program points involving access to the private data of the user via the application programming interface. The functions for this means maybe performed by one or more processors 110 and/or circuitry 115 controlling the computing system 100 to perform the means. The means may involve algorithms as described above, e.g., in reference to sections 2-4.

The apparatus includes means, responsive to each selected one of the one or more program points, for rewriting code in the application to replace a source statement, at the selected program point, that accesses the private data with another statement that allocates a mock object or value based on a type of an actual value returned by the source statement, wherein the mock object or value does not expose the private data of the user. The functions for this means may be performed by one or more processors 110 and/or circuitry 115 controlling the computing system 100 to perform the means. The means may involve algorithms as described above, e.g., in reference to sections 2-4. The apparatus includes means for packaging the application with the rewritten code as an output application able to be subsequently executed by the user. The functions for this means may be performed by one or more processors 110 and/or circuitry 115 controlling the computing system 100 to perform the means. The means may involve algorithms as described above, e.g., in reference to sections 2-4. The apparatus may include means for outputting the application with the rewritten code for use by the user, such as outputting by a memory controller into the one or more memories 145, outputting by the NW I/F(s) 180, or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium maybe, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include a propagating wave.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-readable storage medium comprising computer-readable code embodied thereon, wherein execution of the computer-readable code by at least one processor causes an apparatus to perform:

accessing, by the apparatus, a permission that is to be revoked for an application, wherein the permission involves access to private data of a user via an application programming interface of an operating system;

determining, in the application, one or more program points from among program locations involving access to the private data of the user via the application programming interface, wherein the determining comprises performing constraint inference process on the code in the application to determine a plurality of constraints on paths through the code, wherein the constraints prevent the application from transitioning into those of the program locations that are considered to be bad locations;

for each selected one of the one or more program points, rewriting code in the application to replace a source statement, at the selected program point, that accesses the private data with another statement that allocates a mock object or value based on a type of an actual value returned by the source statement, wherein the mock object or value does not expose the private data of the user;

packaging, by the apparatus, the application with the rewritten code as an output application able to be subsequently executed by the user; and outputting the application with the rewritten code for use by the user.

2. The computer-readable storage medium of claim 1, wherein the permission is to a protected part of the application programming interface, wherein the rewritten code in the application replacing the source statement accesses methods of the application programming interface, wherein the methods require the permission to access the private data of the user.

3. The computer-readable storage medium of claim 1, wherein performing constraint inference of the code in the application further comprises determining mock objects or values meeting the plurality of constraints and causing flow through the paths that maximizes functionality of the application in absence of an actual value for the private data of the user.

4. The computer-readable storage medium of claim 3, wherein determining mock objects or values further comprises determining that two paths are both good, wherein a good path does not contain a bad location, and determining that a first path of the two paths makes more use of a first value causing the selected path to be traversed, than does a second path of the two paths make of a different second value causing the second path to be traversed, and setting a mock object or value to the first value.

5. The computer-readable storage medium of claim 3, wherein execution of the computer-readable code by at least one processor further causes the apparatus to perform the following: performing constraint solving to satisfy as many as possible of good constraints, which capture conditions that force execution along a good path, while simultaneously refraining from violating any bad constraints, which ensure that execution along bad paths are avoided, wherein each bad path contains at least one bad location and each good path does not contain a bad location.

6. The computer-readable storage medium of claim 5, wherein a bad location comprises a program point where (i) an exception is thrown or (ii) an error-handling method is invoked.

7. The computer-readable storage medium of claim 5, wherein constraint solving comprises assigning a good constraint a first weight and assigning a bad constraint a different, second weight, and partitioning the constraints into clusters according to a conflict relation.

8. An apparatus comprising:
one or more memories comprising computer-readable code;
one or more processors coupled to the one or more memories, wherein the one or more processors are configured by execution of the computer-readable code to cause the apparatus to perform the following:
accessing a permission that is to be revoked for an application, wherein the permission involves access to private data of a user via an application programming interface of an operating system;
determining, in the application, one or more program points from among program locations involving access to the private data of the user via the application programming interface, wherein the determining comprises performing constraint inference process on the code in the application to determine a plurality of constraints on paths through the code, wherein the constraints prevent the application from transitioning into those of the program locations that are considered to be bad locations;
for each selected one of the one or more program points, rewriting code in the application to replace a source statement, at the selected program point, that accesses the private data with another statement that allocates a mock object or value based on a type of an actual value returned by the source statement, wherein the mock object or value does not expose the private data of the user;
packaging the application with the rewritten code as an output application able to be subsequently executed by the user; and
outputting the application with the rewritten code for use by the user.

9. The apparatus of claim 8, wherein the permission is to a protected part of the application programming interface, wherein the rewritten code in the application replacing the source statement accesses methods of the application programming interface, wherein the methods require the permission to access the private data of the user.

10. The apparatus of claim 8, wherein performing constraint inference of the code in the application further comprises determining mock objects or values meeting the plurality of constraints and causing flow through the paths that maximizes functionality of the application in absence of an actual value for the private data of the user.

11. The apparatus of claim 10, wherein determining mock objects or values further comprises determining that two paths are both good, wherein a good path does not contain a bad location, and determining that a first path of the two paths makes more use of a first value causing the selected path to be traversed, than does a second path of the two paths make of a different second value causing the second path to be traversed, and setting a mock object or value to the first value.

12. The apparatus of claim 10, wherein the one or more processors are further configured by execution of the computer-readable code to cause the apparatus to perform the following: performing constraint solving to satisfy as many as possible of good constraints, which capture conditions that force execution along a good path, while simultaneously refraining from violating any bad constraints, which ensure that execution along bad paths are avoided, wherein each bad path contains at least one bad location and each good path does not contain a bad location.

13. The apparatus of claim 12, wherein a bad location comprises a program point where (i) an exception is thrown or (ii) an error-handling method is invoked.

14. The apparatus of claim 12, wherein constraint solving comprises assigning a good constraint a first weight and assigning a bad constraint a different, second weight, and partitioning the constraints into clusters according to a conflict relation.

15. A method, comprising:
accessing, by a computing system, a permission that is to be revoked for an application, wherein the permission involves access to private data of a user via an application programming interface of an operating system;
determining, in the application, one or more program points from among program locations involving access to the private data of the user via the application programming interface, wherein the determining comprises performing constraint inference process on the code in the application to determine a plurality of constraints on paths through the code, wherein the constraints prevent the application from transitioning into those of the program locations that are considered to be bad locations;
in response to each selected one of the one or more program points, rewriting code in the application to replace a source statement, at the selected program point, that accesses the private data with another statement that allocates a mock object or value based on a type of an actual value returned by the source statement, wherein the mock object or value does not expose the private data of the user;
packaging, by a computing system, the application with the rewritten code as an output application able to be subsequently executed by the user; and
outputting the application with the rewritten code for use by the user.

* * * * *